(12) United States Patent
Xu et al.

(10) Patent No.: US 11,582,744 B2
(45) Date of Patent: Feb. 14, 2023

(54) ADMISSION CONTROL IN IAB SYSTEM

(71) Applicant: Nokia Technologies Oy, Espoo (FI)

(72) Inventors: Xiang Xu, Jiangsu (CN); Colin Kahn, Morris Plains, NJ (US); Mark Cudak, Rolling Meadows, IL (US); Ayaz Ahmed, Bengaluru (IN)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 17/274,478

(22) PCT Filed: Sep. 20, 2018

(86) PCT No.: PCT/CN2018/106821
§ 371 (c)(1),
(2) Date: Mar. 9, 2021

(87) PCT Pub. No.: WO2020/056700
PCT Pub. Date: Mar. 26, 2020

(65) Prior Publication Data
US 2021/0329629 A1    Oct. 21, 2021

(51) Int. Cl.
*H04W 72/04* (2009.01)
*H04W 76/30* (2018.01)
(Continued)

(52) U.S. Cl.
CPC ..... *H04W 72/0426* (2013.01); *H04W 72/085* (2013.01); *H04W 76/30* (2018.02); *H04W 88/14* (2013.01)

(58) Field of Classification Search
CPC ........... H04W 72/0426; H04W 72/085; H04W 76/30; H04W 88/14
See application file for complete search history.

(56) References Cited

U.S. PATENT DOCUMENTS

| 2014/0016539 A1 | 1/2014 | Rohit |
| 2021/0045036 A1* | 2/2021 | Wei ................... H04W 40/22 |
| 2021/0168646 A1* | 6/2021 | Chen .................. H04W 88/14 |

FOREIGN PATENT DOCUMENTS

| CN | 104871617 A | 8/2015 |
| CN | 108513323 A | 9/2018 |

(Continued)

OTHER PUBLICATIONS

"TP to TR 38.874 on QoS Handling for the Adaptation layer above RLC layer", Ericsson, 3GPP TSG-RAN WG3 Meeting #101, R3-184930, Aug. 20-24, 2018, 8 pgs.

(Continued)

*Primary Examiner* — Robert C Scheibel
(74) *Attorney, Agent, or Firm* — Harrington & Smith

(57) ABSTRACT

A method for admission control including transmitting a first admission request to a distributed unit of the IAB donor, wherein the first admission request includes information about a resource set to be established for a terminal device; receiving a first admission response from the distributed unit indicating whether one or more resources in the resource set are to be accepted; transmitting a second admission request to each of at least one IAB node including information about the resource set; receiving a second admission response from each of the at least one IAB node indicating whether one or more resources in the resource set are to be accepted; and in response to determining that at least one resource in the resource set is to be accepted, transmitting to an IAB node serving the terminal device a request for establishing a context of the terminal device including information about the resource.

19 Claims, 6 Drawing Sheets

(51) Int. Cl.
   *H04W 72/08*     (2009.01)
   *H04W 88/14*     (2009.01)

(56) References Cited

FOREIGN PATENT DOCUMENTS

| EP | 1 324 628 A1 | 7/2003 |
| WO | WO-2020/029196 A1 | 2/2020 |

OTHER PUBLICATIONS

"Summary of [AH1807#19][IAB] IAB Flow Control and Congestion Handling", LG Electronics Inc., 3GPP TSG-RAN WG2 #103, R2-1812518, Aug. 20-24, 2018, 27 pgs.
"QoS Management of IAB nodes", Huawei, 3GPP TSG-RAN WG3 #101, R3-184867, August 20-24, 2018.
"3$^{rd}$ Generation Partnership Project; Technical Specification Group Radio Access Network; Study on Integrated Access and Backhaul; (Release 15)", 3GPP TR 38.874 V0.4.0, Aug. 2018, 55 pgs.
3GPP TSG-RAN WG2#103, Gothenburg, Sweden, Aug. 20-24, 2018, R2-1812464, "Discussion on UE bearer setup procedure for IAB network", ZTE, 6 pgs.
3GPP TSG-RAN WG3101, Gothenburg, Sweden, Aug. 20-24, 2018, R3-184758, Discussion on UE bearer setup procedure for IAB network, ZTE, 6 pgs.

* cited by examiner

ADMISSION CONTROL IN IAB SYSTEM

CROSS REFERENCE TO RELATED APPLICATION

This patent application is a U.S. National Stage application of International Patent Application Number PCT/CN2018/106821 filed Sep. 20, 2018, which is hereby incorporated by reference in its entirety.

FIELD

Embodiments of the present disclosure generally relate to the field of telecommunications, and in particular, to a method, device and computer readable medium for admission control in an Integrated Access and Backhaul (IAB) system.

BACKGROUND

The 3rd Generation Partnership Project (3GPP) determines standards and specifications for Next Radio (NR) IAB (for example, via TR38.874). Various layer 2 ("L2") and layer 3 ("L3") based solutions have been proposed. In the L2-based solutions, an IAB node contains a distributed unit (DU) and packets are forwarded by the radio layers below Packet Data Convergence Protocol (PDCP) layer. In the L3-based solutions, an IAB node contains a DU and/or a gNB, and packets are forwarded at layers above PDCP layer. In both cases, intermediate IAB nodes perform hop-by-hop routing to maintain connectivity between a serving IAB node for a terminal device and an IAB donor. The terminal device or the IAB node may have multi-connectivity to multiple IAB nodes or IAB donors.

Multi-hop backhauling provides greater range extension than single hop backhauling. This is especially beneficial for backhaul at frequencies above-6 GHz due to limited range. Multi-hop backhauling further enables backhauling around obstacles, for example, buildings and other clutter in urban environments where line-of-sight between nodes is obstructed.

SUMMARY

In general, example embodiments of the present disclosure provide a method, device and computer readable medium for admission control in an IAB system.

In a first aspect, a communication method is provided. The method comprises transmitting a first admission request to a distributed unit of the IAB donor, wherein the first admission request comprises information about a resource set to be established for a terminal device; receiving a first admission response from the distributed unit, wherein the first admission response indicates whether one or more resources in the resource set are to be accepted by the distributed unit; transmitting a second admission request to each of at least one IAB node, wherein the second admission request comprises information about the resource set; receiving a second admission response from each of the at least one IAB node, wherein the second admission response indicates whether one or more resources in the resource set are to be accepted by a respective IAB node among the at least one the IAB node; and in response to determining that at least one resource in the resource set is to be accepted by the distributed unit and the at least one IAB node, transmitting to an IAB node serving the terminal device a request for establishing a context of the terminal device, wherein the request comprises information about the at least one resource.

In some example embodiments, transmitting the second admission request to each of the at least one IAB node comprises: upon receiving the first admission response from the distributed unit of the IAB donor, including information about the first admission response in the second admission request; and transmitting the second admission request to each of the at least one IAB node.

In some example embodiments, the resource set comprises a first dedicated radio bearer; the first admission response indicates that the first dedicated radio bearer is to be accepted by the distributed unit of the IAB donor if a second dedicated radio bearer is released; and the second admission response indicates that the first dedicated radio bearer is to be accepted by the IAB node.

In some example embodiments, the second dedicated radio bearer has been established for a further terminal device served by the IAB node; and the request further comprises information about the second dedicated radio bearer.

In some example embodiments, the second dedicated radio bearer has been established for another terminal device served by the distributed unit of the IAB donor or by one of the at least one the IAB node; and the method further comprises: releasing the second dedicated radio bearer by the centralized unit.

In some example embodiments, the first admission response comprise an identity of the further terminal device and an identity of the second dedicated radio bearer.

In some example embodiments, the dedicated radio bearer set comprises a third dedicated radio bearer and a fourth dedicated radio bearer that is different from the third dedicated radio bearer; the first admission response indicates that the third dedicated radio bearer is to be accepted by the distributed unit of the IAB donor and the fourth dedicated radio bearer is to be rejected by the distributed unit of the IAB donor; and the information about the first admission response comprises information about the third dedicated radio bearer.

In a second aspect, a communication method is provided. The method comprises: receiving an admission request from a centralized unit of an IAB donor in the IAB system, wherein the admission request comprises information about a resource set to be established for a terminal device, the information comprises QoS information associated with the resource set; determining whether one or more resources in the resource set is to be accepted based on the QoS information; and transmitting an admission response to the centralized unit, wherein the admission response indicates a result of the determining.

In some example embodiments, the resource set comprise a first dedicated radio bearer; and the result of the determining comprises: the first dedicated radio bearer is to be accepted if a second dedicated radio bearer is released.

In some example embodiments, the distributed unit is implemented in an IAB node in the IAB system.

In some example embodiments, the method further comprises: receiving, from the centralized unit, a request for establishing a context of the terminal device, wherein the request comprises information about the first dedicated radio bearer to be established and information about the second dedicated radio bearer to be released.

In some example embodiments, the method further comprises: releasing the second dedicated radio bearer.

In some example embodiments, the method further comprises: in response to determining that resources occupied by the second dedicated radio bearer are less than resources required by the first dedicated radio bearer, releasing the second dedicated radio bearer and a third dedicated radio bearer.

In some example embodiments, the method further comprises: in response to determining that resources occupied by the second dedicated radio bearer are less than resources required by the first dedicated radio bearer, releasing a fourth dedicated radio bearer, wherein resources occupied by the fourth dedicated radio bearer are equal to or greater than the resource required by the first dedicated radio bearer.

In some example embodiments, the distributed unit is implemented in the IAB donor.

In a third aspect, a network device is provided. The network device comprises at least one processor and at least one memory including computer program code. The at least one memory and the computer program code are configured to, with the at least one processor, cause the network device to carry out the method according to the first aspect.

In a fourth aspect, a network device is provided. The network device comprises at least one processor and at least one memory including computer program code. The at least one memory and the computer program code are configured to, with the at least one processor, cause the network device to carry out the method according to the second aspect.

In a fifth aspect, a communication apparatus is provided. The apparatus comprise means for transmitting a first admission request to a distributed unit of the IAB donor, wherein the first admission request comprises information about a resource set to be established for a terminal device; means for receiving a first admission response from the distributed unit, wherein the first admission response indicates whether one or more resources in the resource set are to be accepted by the distributed unit; means for transmitting a second admission request to at least one IAB node, wherein the second admission request comprises information about the resource set; means for receiving a second admission response from the at least one IAB node, wherein the second admission response indicates whether one or more resources in the resource set are to be accepted by the IAB node; and means for transmitting to an IAB node serving the terminal device a request for establishing a context of the terminal device in response to determining that at least one resource in the resource set is to be accepted by the distributed unit and the at least one IAB node, wherein the request comprises information about the at least one resource.

In a sixth aspect, a communication apparatus is provided. The apparatus comprise means for receiving an admission request from a centralized unit of an IAB donor in the IAB system, wherein the admission request comprises information about a resource set to be established for a terminal device, the information comprises Quality of Service, QoS, information associated with the resource set; means for determining whether one or more resources in the resource set is to be accepted based on the QoS information; and means for transmitting an admission response to the centralized unit, wherein the admission response indicates a result of the determining.

In a seventh aspect, there is provided a computer-readable medium storing a computer program thereon. The computer program, when executed by a processor, causes the processor to carry out the method according to the first aspect.

In an eighth aspect, there is provided a computer-readable medium storing a computer program thereon. The computer program, when executed by a processor, causes the processor to carry out the method according to the second aspect.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Through the more detailed description of some example embodiments of the present disclosure in the accompanying drawings, the above and other objects, features and advantages of the present disclosure will become more apparent, wherein.

Throughout the drawings, the same or similar reference numerals represent the same or similar element.

DETAILED DESCRIPTION

Figure 1:
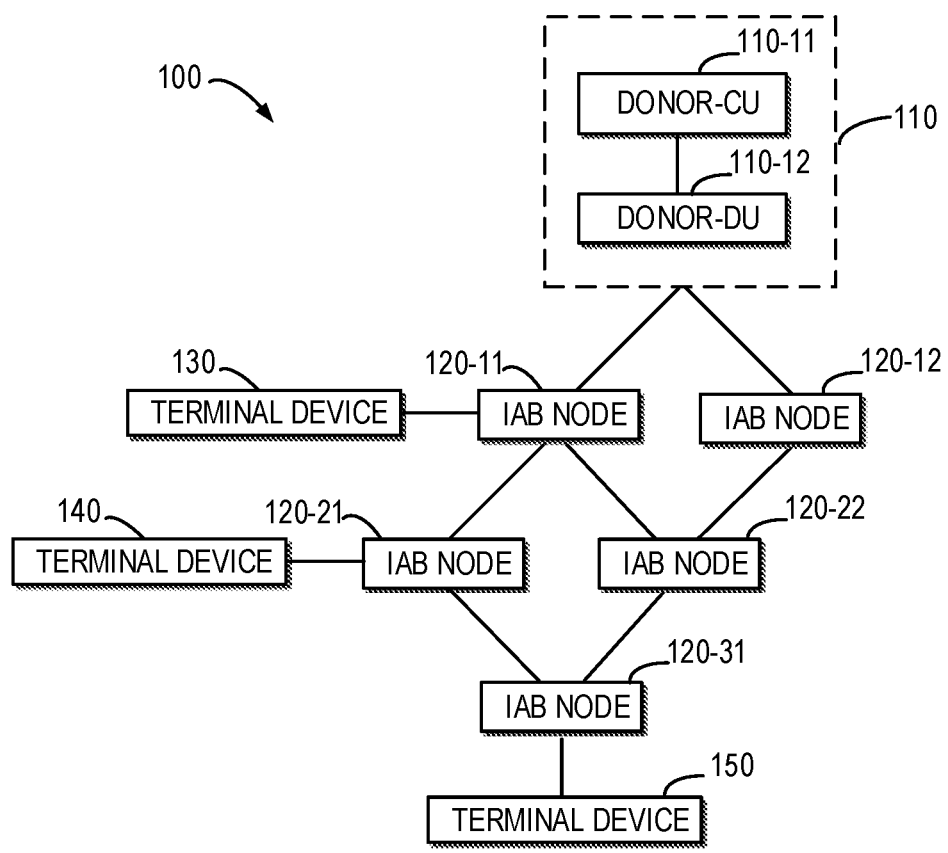
FIG. 1 shows an example IAB system in which example embodiments of the present disclosure can be implemented.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

As used herein, the term "communication network" refers to a network that follows any suitable communication standards or protocols such as long term evolution (LTE), LTE-Advanced (LTE-A) and 5G NR, and employs any suitable communication technologies, including, for example, MIMO, OFDM, time division multiplexing (TDM), frequency division multiplexing (FDM), code division multiplexing (CDM), Bluetooth, ZigBee, machine type communication (MTC), eMBB, mMTC and uRLLC technologies. For the purpose of discussion, in some example embodiments, the LTE network, the LTE-A network, the 5G NR network or any combination thereof is taken as an example of the communication network.

As used herein, the term "network device" refers to any suitable device at a network side of a communication network. The network device may include any suitable device in an access network of the communication network, for example, including a base station (BS), a relay, an access point (AP), a node B (NodeB or NB), an evolved NodeB (eNodeB or eNB), an NG-RAN node (gNB or ng-eNB), a Remote Radio Module (RRU), a radio header (RH), a remote radio head (RRH), a low power node such as a femto, a pico, a gNB Distributed Unit (DU), and a gNB Central Unit (CU) and the like. For the purpose of discussion, in some example embodiments, the gNB is taken as an example of the network device.

The network device may also include any suitable device in a core network, for example, including multi-standard radio (MSR) radio equipment such as MSR BSs, network controllers such as radio network controllers (RNCs) or base station controllers (BSCs), Multi-cell/multicast Coordination Entities (MCEs), Mobile Switching Centers (MSCs) and MMEs, Operation and Management (O&M) nodes, Operation Support System (OSS) nodes, Self-Organization Network (SON) nodes, positioning nodes, such as Enhanced Serving Mobile Location Centers (E-SMLCs), and/or Mobile Data Terminals (MDTs), and 5G Core network nodes such as the Access Management Function (AMF), Session Management Function (SMF).

As used herein, the term "terminal device" refers to a device capable of, configured for, arranged for, and/or operable for communications with a network device or a further terminal device in a communication network. The communications may involve transmitting and/or receiving wireless signals using electromagnetic signals, radio waves, infrared signals, and/or other types of signals suitable for conveying information over air. In some example embodiments, the terminal device may be configured to transmit and/or receive information without direct human interaction. For example, the terminal device may transmit information to the network device on predetermined schedules, when triggered by an internal or external event, or in response to requests from the network side.

Examples of the terminal device include, but are not limited to, user equipment (UE) such as smart phones, wireless-enabled tablet computers, laptop-embedded equipment (LEE), laptop-mounted equipment (LME), Mobile Terminals (MT), such as those embedded in IAB nodes and/or wireless customer-premises equipment (CPE). For the purpose of discussion, in the following, some example embodiments will be described with reference to UEs as examples of the terminal devices, and the terms "terminal device" and "user equipment" (UE) may be used interchangeably in the context of the present disclosure.

As used herein, the term "cell" refers to an area covered by radio signals transmitted by a network device. The terminal device within the cell may be served by the network device and access the communication network via the network device.

As used herein, the term "circuitry" may refer to one or more or all of the following: (a) hardware-only circuit implementations (such as implementations in only analog and/or digital circuitry); and (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions; and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the singular forms "a", "an", and "the" are intended to include the plural forms as well, unless the context clearly indicates otherwise. The term "includes" and its variants are to be read as open terms that mean "includes, but is not limited to". The term "based on" is to be read as "based at least in part on". The term "one embodiment" and "an embodiment" are to be read as "at least one embodiment". The term "another embodiment" is to be read as "at least one other embodiment". Other definitions, explicit and implicit, may be included below.

FIG. 1 shows an example IAB system 100 in which example embodiments of the present disclosure can be implemented. The IAB system 100 includes an IAB donor 110 and IAB nodes 120-11, 120-12, 120-21, 120-22, 120-31 underneath the IAB donor 110. The IAB nodes 120-11, 120-12, 120-21, 120-22, 120-31 may be collectively referred to as IAB node 120.

The IAB donor 110 may be implemented as a gNB that terminates wireless backhaul radio interface from one or more IAB nodes. The IAB donor 110 has wired/fiber connectivity with a core network. The IAB donor 110 may include a centralized unit (CU) 110-11 and one or more distributed units (DUs). FIG. 1 shows that the IAB donor 110 includes a distributed unit (DU) 110-12 by way of example. Hereinafter, the CU of the IAB donor is also referred to as Donor-CU and the DU of the IAB donor is also referred to as Donor-DU.

In case where the IAB system 100 is implemented by using the L2-based solutions, the IAB node 120 may include a DU, but does not include CU. In case where the JAB system 100 is implemented by using the L3-based solutions, the IAB node 120 may include a DU or include a DU and a CU.

In example embodiments, each IAB node logically includes a mobile terminal (MT) that maintains connectivity with one or more upstream nodes (using for example, dual connectivity). Similar to a conventional user equipment which includes an MT, the MT of an IAB node may use radio resource control (RRC) signalling to supply radio link measurements of alternative upstream nodes to its current serving gNB CU. Based on signal strength, signal quality and other factors, a handover of an IAB node to a different upstream node may be triggered by RRC. The Donor-CU may also add or remove dual/Multi-Connectivity (DC/MC) legs by sending RRC Connection Reconfiguration messages. Hence, the IAB topology, such as the one shown in FIG. 1, may be non-static. The IAB topology may change over time as radio conditions fluctuate, and as IAB nodes move, are added or removed. Handover and addition or removal of DC legs may be designed to work on a time scale of seconds to minutes, corresponding to macroscopic movement of MTs through a cellular network.

A CU (such as Donor-CU or CU of an IAB node) may be a logical node which may include the functions (for example, gNB functions) such as transfer of user data, mobility control, radio access network sharing, positioning, session management etc., except those functions allocated exclusively to DUs. The CU may control the operation of the DUs over a front-haul (F1) interface. A DU is a logical node which may include a subset of the functions (for example, gNB functions), depending on the functional split option. The operations of the DUs may be controlled by the CU.

The IAB donor 110 may serve directly connected IAB nodes such as the IAB node 120-11 and IAB node 120-12, and IAB nodes that are chained over multiple wireless backhaul hops such as IAB node 120-21, IAB node 120-22 and IAB node 120-31. The IAB donor 110 may also serve directly connected terminal devices (not shown). The IAB node 120 may serve one or more terminal devices directly connected to the IAB node 120. For example, as shown in FIG. 1, the IAB node 120-11 may serve a terminal device 130 directly connected to the IAB node 120-11, the IAB node 120-21 may serve a terminal device 140 directly connected to the IAB node 120-21, and the IAB node 120-31 may serve a terminal device 150 directly connected to the IAB node 120-31.

It is to be understood that the number of IAB nodes and terminal devices connected to the IAB nodes is only for the purpose of illustration without suggesting any limitations. The IAB system may include any suitable number of IAB nodes and terminal devices adapted for implementing example embodiments of the present disclosure.

Currently, in an architecture where a CU and DUs are separate, if a terminal device is powered on and attached to the network, an IAB donor initiates a procedure for establishing a context of the terminal device. Establishing the context of the terminal device may include establishing one or more dedicated radio bearers for the terminal device. For the purpose of establishing the context of the terminal device, the IAB donor transmits a context setup request to a DU of an IAB node to which the terminal device attempts to access. The context setup request may include information about one or more dedicated radio bearers to be established for the terminal device. Upon receiving the context setup request, the DU of the IAB node performs an admission control based on available resources to determine whether the one or more dedicated radio bearers are to be accepted or rejected. In other words, the admission control is only performed by the DU of the IAB node to which the terminal device attempts to access.

Because data of an IAB node and data for terminal devices connected to the IAB node will be consolidated into an upstream IAB node of the IAB node, for example, via RLC-channels between the IAB node and the upstream IAB node, the upstream IAB node has less free resources than the IAB node. If an IAB node to be accessed has sufficient resources available to a dedicated radio bearer while an upstream IAB node of the IAB node has insufficient resources, for example, not be able to support the RLC-channels between the IAB node and the upstream IAB node, the dedicated radio bearer cannot be established.

In addition, it is proposed that an admission control in a multi-hop IAB system may be implemented in a distributed way. In this solution, each IAB node in the system may make its own decision on admission control. Due to different number of downstream terminal devices and IAB nodes, each IAB node may have different load situation. Thus, in some scenarios, the admission control results from the IAB node to be accessed and intermediate IAB nodes between the IAB node and the IAB donor may be inconsistent. As a result, it is unclear how the whole procedure works, especially when pre-emption needs to be performed.

In order to address at least some of the above problems and other potential problems, according to embodiments of the present disclosure, there is proposed a solution for admission control in an IAB system. In this solution, a Donor-CU queries the Donor-DU and intermediate IAB nodes (if any) about whether they can accept a DRB to be established for a terminal device. For example, whether the Donor-DU and intermediate IAB nodes have sufficient resource to support the RLC-Channels to be established/modified between the IAB node and the upstream IAB node or Donor-DU to carry the user plane traffic of the terminal device's DRB. If the Donor-DU and intermediate IAB nodes can accept the DRB, the Donor-CU will transmit a context setup request to a serving IAB node for the terminal device. Upon receiving the context setup request, the serving IAB node makes a final decision to setup one or more DRBs and release one or more DRBs.

With this solution, because the Donor-CU has inquired and consolidated the Donor-DU and intermediate IAB nodes (if any) about whether they can accept the DRB to be established, it may avoid failure of establishment of the DRB due to inconsistent admission control results from the Donor-DU, intermediate IAB nodes and the serving IAB node.

Principle and implementations of the present disclosure will be described in detail below with reference to FIG. 2, which shows a process 200 for admission control according to an embodiment of the present disclosure. For the purpose of discussion, the process 200 will be described with reference to FIG. 1 and by taking example of establishing one or more DRBs for the terminal device 130 served by the IAB node 120-11. The process 200 may involve the Donor-CU 110-11, the Donor-DU 110-12 and the IAB node 120-11 in FIG. 1.

The Donor-CU 110-11 transmits (210) a first admission request to the Donor-DU 110-12. The first admission request comprises information about a resource set for the terminal device 130. For example, the resource set may be a DRB set, and/or a QoS flow set to be established for the terminal device 130. The first admission request also indicates the next downstream IAB node to reach the terminal device. The downstream IAB node may or may not be the serving IAB node for the terminal device 130. In this example, Donor-DU knows the next downstream IAB node is IAB node 120-11. For the purpose of discussion only, the resource set will be described taking the DRB set for example, without suggesting any limitation to the scope of the present disclosure.

In some embodiments, the DRB set may include one or more DRBs. The information about the DRB set may include Quality of Service (QoS) information associated with each of the DRBs in the DRB set. The QoS flow set may include one or more QoS flows. The information about the QoS flow set may include Quality of Service (QoS) information associated with each of the QoS flows in the QoS flow set. In some embodiments, the QoS information may include Guaranteed Bit Rate (GBR) QoS Flow Information as specified in 3GPP TS 38.473. Because the information about the DRB set and/or the QoS flow set include QoS information associated with each of the DRBs and/or QoS flows, instead of the full context of the terminal device 130, the overhead of the admission request may be reduced.

Upon receiving the first admission request from the Donor-CU 110-11, the Donor-DU 110-12 determines whether the one or more resources in the resource set are to be accepted based on the information about the resource set, and the information of next downstream node for the terminal device. For example, Donor-DU 110-12 checks whether the Donor-DU 110-12 have sufficient resource to support the RLC-Channels to be established/modified between the Donor-DU 110-12 and the IAB node 120-11 to carry the user plane traffic of the terminal device's DRB and/or QoS flow. In embodiments where the information about the resource set includes QoS information associated with each of the DRBs in the DRB set, the Donor-DU 110-12 determines whether the one or more DRBs in the DRB set are to be accepted based on the QoS information. The Donor-DU 110-12 may also take the information of the downstream IAB node into consideration. For example, if the downstream IAB node is far away from the Donor-DU 110-12, the radio connection with this downstream IAB node may be not good, thus the Donor-DU 110-12 may need to allocate more radio resource than another downstream IAB node with good radio connection.

With respect to a DRB (also referred to as "first DRB") in the DRB set, the Donor-DU 110-12 may accept the first DRB if the Donor-DU 110-12 has sufficient resources for the first DRB. If the Donor-DU 110-12 has insufficient resources for the first DRB, the Donor-DU 110-12 may accept the first DRB by releasing resources for a second DRB with a lower priority than the first DRB. In other words, the Donor-DU 110-12 may accept the first DRB by pre-empting the second DRB with a lower priority than the first DRB. The second DRB in this case may be associated with a different terminal device, or with the terminal device 130.

In some embodiments, the Donor-DU 110-12 may pre-empt the second DRB with the lower priority based on the criteria as specified in TS 38.413. For example, for each DRB requested to be established, the Donor-DU 110-12 may establish or modify the resources according to values of the Allocation and Retention Priority Information Element (IE) in the first admission request received from the Donor-CU 110-11. The Allocation and Retention Priority IE may include a Priority Level IE, a Pre-emption Vulnerability IE and a Pre-emption Capability IE.

The Donor-DU 110-12 shall only pre-empt DRBs with lower priority in an ascending order of priority. The pre-emption may be done for DRBs belonging to the same terminal device or to other terminal devices.

The priority levels in Priority Level IEs and the pre-emption indicators in Pre-emption Vulnerability IEs and Pre-emption Capability IEs may individually or in combination be used to determine whether the DRB setup process has to be performed unconditionally and immediately. If a requested DRB is marked as "may trigger pre-emption" and the resource situation requires triggering the pre-emption, the Donor-DU 110-12 may trigger the pre-emption procedure which may then cause the forced release of a lower priority DRB which is marked as "pre-emptable". Whilst the process and the extent of the pre-emption procedure are operator-dependent, the pre-emption indicators may be treated as follows.

If the Pre-emption Capability IE is set to "may trigger pre-emption", this allocation request may trigger the pre-emption procedure. If the Pre-emption Capability IE is set to "shall not trigger pre-emption", this allocation request shall not trigger the pre-emption procedure.

If the Pre-emption Vulnerability IE is set to "pre-emptable", this DRB shall be included in the pre-emption process. If the Pre-emption Vulnerability IE is set to "not pre-emptable", this DRB shall not be included in the pre-emption process.

If the Priority Level IE is set to "no priority", the given values for the Pre-emption Capability IE and Pre-emption Vulnerability IE shall not be considered. Instead, the values "shall not trigger pre-emption" and "not pre-emptable" shall prevail.

Upon determining whether to accept one or more resources in the resource set, the Donor-DU 110-12 transmits a first admission response to the Donor-CU 110-11. The first admission response indicates whether one or more resources in the resource set are to be accepted by the Donor-DU 110-12. Accordingly, the Donor-CU 110-11 receives (220) the first admission response from the Donor-DU 110-12.

In the embodiments where the Donor-DU 110-12 determines to accept the first DRB by releasing the second DRB, the first admission response indicates that the first DRB is to be accepted by the Donor-DU 110-12 if the second DRB is released. The second DRB has been established for a different terminal device, or may be another DRB for the same device. The different terminal device may be served by the Donor-DU 110-12 or by an IAB node. For example, the different terminal device may be the terminal device 150 served by the IAB node 120-31 in FIG. 1. In some embodiments, the first admission response may include an identity of the different terminal device and an identity of the second DRB. Examples of the identity of the second DRB may include but are not limited to DRB ID of the second DRB or bearer ID of the second DRB.

It should be noted that even if the Donor-DU 110-12 determines that the second DRB is to be released, the Donor-DU 110-12 will not release the second DRB. Instead, the Donor-DU 110-12 just provides the Donor-CU 110-11 with suggestion that the second DRB should be released. For example, if the Donor-CU 110-11 makes a different decision on DRBs to be released, or if the serving IAB node 120-11 rejects the first DRB to be established, there is no need for the Donor-DU 110-12 to change the current active second DRB.

Figure 2:
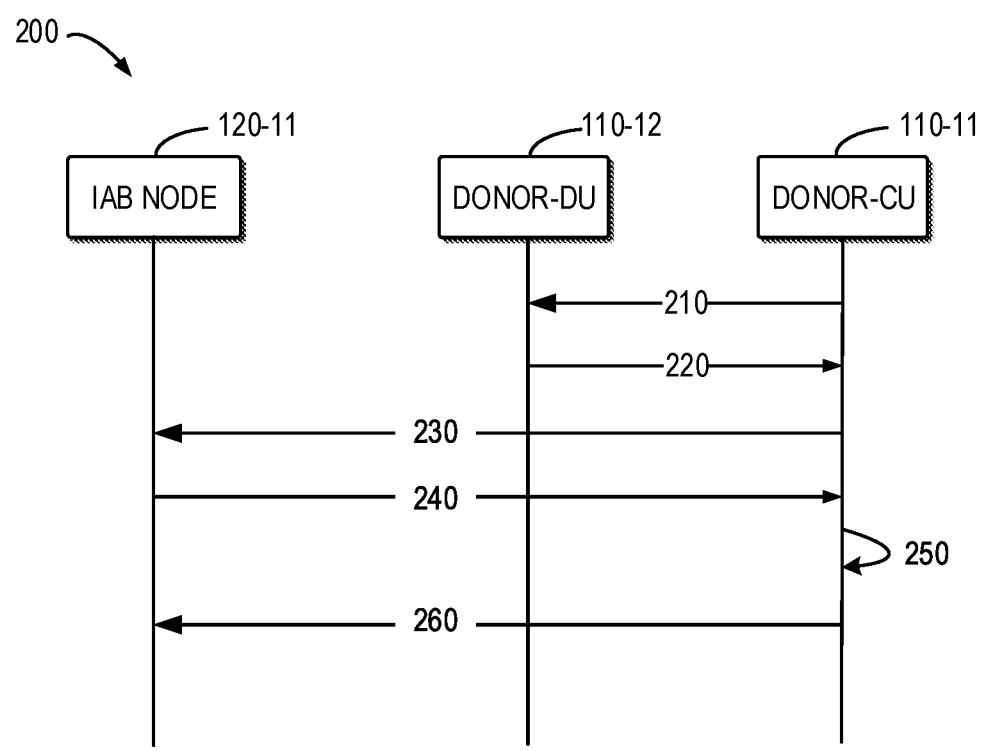
FIG. 2 is a signalling chart of an example process for admission control in accordance with some embodiments of the present disclosure.

With continued reference to FIG. 2, the Donor-CU 110-11 transmits (230) a second admission request to the IAB node 120-11 serving the terminal device 130. The second admission request comprises information about the DRB set. In some embodiments, the information about the DRB set in the second admission request may include information about all or part of the DRBs in the DRB set.

It should be understood that the act 230 and the act 210 may be performed in parallel or the act 230 may be performed after the acts 210 and 220. The scope of the present disclosure is not limited thereto.

In embodiments where the act 230 and the act 210 are performed in parallel, the information about the DRB set in the second admission request may include information about all of the DRBs in the DRB set because the Donor-CU 110-11 has no knowledge about the admission control result of the Donor-DU 110-12.

In embodiments where the act 230 is performed after the acts 210 and 220, the information about the DRB set in the second admission request may include information about part of the DRBs in the DRB set so as to simplify the process of the IAB node 120-11. In such embodiments, upon receiving (220) the first admission response from the Donor-DU 110-12, the Donor-CU 110-11 may include information about the first admission response in the second admission request. Then, the Donor-CU 110-11 transmits to the IAB node 120-11 the second admission request including the information about the first admission response.

Consider an example where the DRB set includes a third DRB and a fourth DRB that is different from the third DRB. Upon receiving the first admission request from the Donor- CU 110-11, the Donor-DU 110-12 may determine to accept the third DRB and to reject the fourth DRB if the Donor-DU 110-12 has not sufficient resources for both of the third and fourth DRBs. In this case, the Donor-DU 110-12 may transmit the first admission response indicating that the third DRB is to be accepted by the Donor-DU 110-12 and the fourth DRB is to be rejected by the Donor-DU 110-12.

Upon receiving the first admission response from the Donor-DU 110-12, the Donor-CU 110-11 may include the information about the first admission response in the second admission request, indicating to the IAB node 120-11 that the third DRB is to be accepted by the Donor-DU 110-12 and the fourth DRB is to be rejected by the Donor-DU 110-12. Upon receiving the second admission request from the Donor-CU 110-11, the IAB node 120-11 may do not take the fourth DRB into account, but determine whether it has sufficient resources for the third DRB.

Alternatively, upon receiving the first admission response from the Donor-DU 110-12, the Donor-CU 110-11 may include only the information about the third DRB in the second admission request. Thus, the IAB node 120-11 may only determine whether it has sufficient resources for the third DRB. In this manner, the processing of the IAB node 120-11 may be simplified.

Upon receiving the second admission request from the Donor-CU 110-11, the IAB node 120-11 determines whether one or more resources in the resource set can be accepted based on the information about the subset.

Similar to the operations of the Donor-DU 110-12, with respect to a DRB in the subset, the IAB node 120-11 may accept the DRB if the IAB node 120-11 has sufficient resources for the DRB. If the IAB node 120-11 has not sufficient resources for the DRB, the IAB node 120-11 may accept the DRB by releasing resources for a further DRB with a lower priority than the DRB based on the criteria as specified in TS 38.413.

Upon determining whether the one or more resources in the resource set are to be accepted, the IAB node 120-11 transmits a second admission response to the Donor-CU 110-11. The second admission response indicates whether the one or more resources in the resource set is to be accepted by the IAB node 120-11. Accordingly, the Donor-CU 110-11 receives (240) the second admission response from the IAB node 120-11.

It may be understood that the Donor-DU 110-12 and the IAB node 120-11 may make different results of admission control with respect to a DRB due to, for example, different loading or Dual-Connectivity, or Multi-Connectivity to different IAB Donors. Because the Donor-DU 110-12 is located in the upstream of the IAB node 120-11, the Donor-DU 110-12 may have less free resources than the IAB node 120-11. For example, with respect to a DRB, for example, the first DRB, the IAB node 120-11 may determine to accept the first DRB while the Donor-DU 110-12 may determine to accept the first DRB if a further DRB, for example, the second DRB, is released. Therefore, the first admission response from the Donor-DU 110-12 may indicate that the first DRB is to be accepted by the Donor-DU 110-12 if the second DRB is released, and the second admission response from the IAB node 120-11 may indicate that the first DRB is to be accepted by the JAB node 120-11.

In addition, although it is shown that the IAB node 120-11 is connected to the IAB donor 110, in some embodiments, the IAB node 120-11 may be connected to both of the IAB donor 110 and another IAB donor (not shown). In this situation, the IAB donor 110 may not have full knowledge of the resource usage in the IAB node 120-11 without receiving the second admission response from the IAB node 120-11.

In embodiments where the act 210 and the act 230 are performed in parallel, based on the first and second admission responses, the Donor-CU 110-11 has full knowledge of the resource usage in the Donor-DU 110-12 and the IAB node 120-11. Thus, the Donor-CU 110-11 may make (250) an initial decision on whether to accept all the resources in the resource set or a subset of the resource set, accept one or more resources with the pre-emption of another resource, or even reject all the resources. If the Donor-CU 110-11 determines that at least one resource in the resource set is to be accepted by both of the Donor-DU 110-12 and the IAB node 120-11, the Donor-CU 110-11 transmits (260) to the IAB node 120-11 a request for establishing a context of the terminal device 130. The request comprises information about the at least one resource.

In embodiments where the second DRB to be released has been established for a further terminal device served by the IAB node 120-11, the request for establishing the context of the terminal device 130 may include information about the second DRB to be released. For example, the request may include an identity of the further terminal device and an identity of the second DRB.

In some embodiments, upon receiving the request, the IAB node 120-11 may release the second DRB.

In some embodiments, the second DRB to be released may belong to a terminal device that has a very good radio connection. The terminal device 130 may have poor radio conditions with a low Modulation and Coding Scheme (MCS). Thus, more radio resources are required to support the required QoS of the first DRB to be established. That is, resources occupied by the second DRB are less than resources required by the first DRB to be established. In such embodiments, the IAB node 120-11 may release the second DRB and release another DRB for another terminal device. Alternatively, the IAB node 120-11 may release a further DRB for a further terminal device, wherein resources occupied by the further DRB is equal to or greater than the resource required by the first DRB.

In some embodiments where the IAB node 120-11 has sufficient radio resources, the IAB node 120-11 may still release the second DRB in order to free backhaul resources for the DRB to be established. It should be noted that this is different from the conventional admission control in a DU. In the conventional admission control, the DU only checks the radio resources. If there are sufficient radio resources, the DU does not perform pre-emption or release existing one or more DRBs.

In some embodiments, the IAB node 120-11 may configures the terminal device 130 for the accepted one or more DRBs. Upon configuration, the IAB node 120-11 may transmit to the Donor-CU 110-11 a response to the request for establishing the context of the terminal device 130.

Upon receiving the response to the request for establishing the context of the terminal device 130, the Donor-CU 110-11 may update the Donor-DU 110-12 and IAB node 120-11 with the final list of DRBs to be released. In embodiments where the second DRB to be released has been established for a terminal device served by other IAB node than the IAB node 120-11, the Donor-CU 110-11 may release the second DRB.

It is to be understood that in some embodiments, the act 210 may be performed after the act 230. In such embodiments, upon receiving the second admission response from the IAB node 120-11, the Donor-CU 110-11 includes information about the second admission response in the first admission request, and transmits the first admission request to the Donor-DU 110-12.

Figure 3:
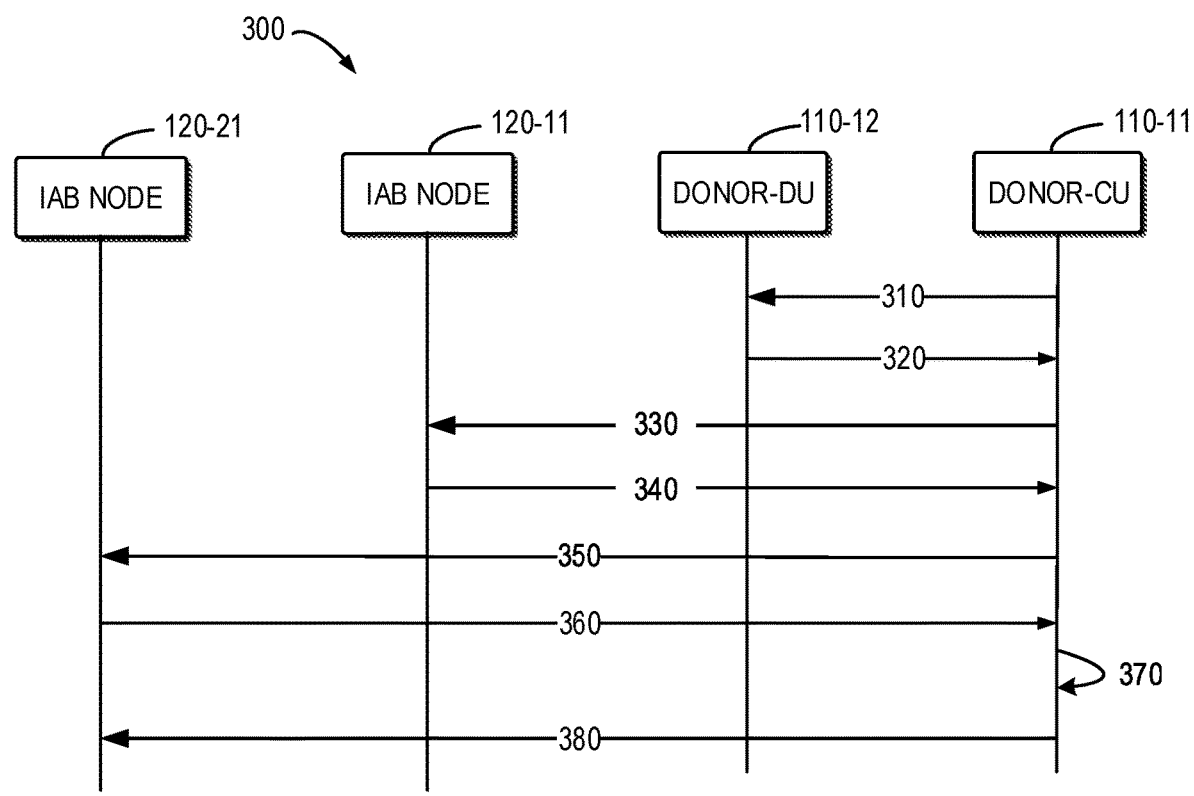
FIG. 3 is a signalling chart of an example process for admission control in accordance with some embodiments of the present disclosure.

It is to be understood that the admission control solution of the present disclosure has be described by taking example of establishing one or more resources for the terminal device 130 served by the IAB node 120-11. The admission control solution of the present disclosure may be used for establishing one or more resources for terminal devices served by any of the IAB nodes 120-11, 120-12, 120-21, 120-22, 120-31 in FIG. 1. For example, the admission control solution may be used for establishing one or more resources for the terminal device 140 served by the IAB node 120-21. FIG. 3 shows a process 300 for admission control according to such an embodiment of the present disclosure. For the purpose of discussion, the process 300 will be described with reference to FIG. 1 and by taking example of establishing one or more resources for the terminal device 140 served by the IAB node 120-21. The process 300 may involve the Donor-CU 110-11, the Donor-DU 110-12, the IAB node 120-11 and the IAB node 120-21 in FIG. 1.

The Donor-CU 110-11 transmits (310) a first admission request to the Donor-DU 110-12. The first admission request comprises information about a resource set for the terminal device 140. For example, the resource set can be a DRB set, and/or a QoS flow set to be established for the terminal device 140. The first admission request also indicates the next downstream IAB node to reach the UE. The downstream IAB node may or may not be the serving IAB node for the terminal device 140. In this example, Donor-DU knows the next downstream IAB node is IAB node 120-11.

In some embodiments, the DRB set may include one or more DRBs. The information about the DRB set may include QoS information associated with each of the DRBs in the DRB set. The QoS flow set may include one or more QoS flows. The information about the QoS flow set may include Quality of Service (QoS) information associated with each of the QoS flows in the QoS flow set. In some embodiments, the QoS information may include GBR QoS Flow Information as specified in 3GPP TS 38.473. Because the information about the DRB set and/or the QoS flow set includes QoS information associated with each of the DRBs and/or QoS flows, instead of the full context of the terminal device 140, the overhead of the admission request may be reduced.

Upon receiving the first admission request from the Donor-CU 110-11, the Donor-DU 110-12 determines whether the one or more resources in the resource set are to be accepted based on the information about the resource set, and the information of next downstream node for the terminal device. For example, Donor-DU 110-12 checks whether the Donor-DU 110-12 have sufficient resource to support the RLC-Channels to be established/modified between the Donor-DU 110-12 and the IAB node 120-11 to carry the user plane traffic of the terminal device's resource and/or QoS flow. In embodiments where the information about the DRB set includes QoS information associated with each of the DRBs in the DRB set, the Donor-DU 110-12 determines whether the one or more DRBs in the DRB set are to be accepted based on the QoS information. The Donor-DU 110-12 also takes the information of the downstream IAB node into consideration. For example, if the downstream IAB node is far away from the Donor-DU 110-12, the radio connection with this downstream IAB node may be not good, thus the Donor-DU 110-12 may need to allocate more radio resource than another downstream IAB node with good radio connection.

With respect to a first DRB in the DRB set, the Donor-DU 110-12 may accept the first DRB if the Donor-DU 110-12 has sufficient resources for the first DRB. If the Donor-DU 110-12 has insufficient resources for the first DRB, the Donor-DU 110-12 may accept the first DRB by releasing or pre-empting a second DRB with a lower priority than the first DRB. In some embodiments, the Donor-DU 110-12 may pre-empt the second DRB with the lower priority based on the criteria as specified in TS 38.413, as described with reference to FIG. 2.

Upon determining whether to accept one or more resources in the resource set, the Donor-DU 110-12 transmits a first admission response to the Donor-CU 110-11. The first admission response indicates whether the one or more resources in the resource set are to be accepted by the Donor-DU 110-12. Accordingly, the Donor-CU 110-11 receives (320) the first admission response from the Donor-DU 110-12.

In the embodiments where the Donor-DU 110-12 determines to accept the first DRB by releasing the second DRB, the first admission response indicates that the first DRB is to be accepted by the Donor-DU 110-12 if the second DRB is released. The second DRB has been established for a different terminal device. For example, the different terminal device may be the terminal device 130 or 150 in FIG. 1. In some embodiments, the first admission response may include an identity of the different terminal device and an identity of the second DRB to be released. Examples of the identity of the second DRB may include but are not limited to DRB ID of the second DRB or bearer ID of the second DRB.

With continued reference to FIG. 3, the Donor-CU 110-11 transmits (330) a second admission request to the IAB node 120-11. The second admission request comprises information about one or more resources in the resource set. The one or more resources may include all or part of the resources in the resource set.

Upon receiving the second admission request from the Donor-CU 110-11, the IAB node 120-11 determines whether one or more resources in the resource set are to be accepted based on the information about the first subset.

Similar to the operations of the Donor-DU 110-12, with respect to a DRB in the first subset, the IAB node 120-11 may accept the DRB if the IAB node 120-11 has sufficient resources for the DRB. If the IAB node 120-11 has not sufficient resources for the DRB, the IAB node 120-11 may accept the DRB by releasing resources for a further DRB with a lower priority than the DRB based on the criteria as specified in TS 38.413, for example.

Upon determining whether the one or more resources in the resource set are to be accepted, the IAB node 120-11 transmits a second admission response to the Donor-CU 110-11. The second admission response indicates whether the one or more resources in the resource set are to be accepted by the IAB node 120-11. For example, similar to the operations of the Donor-DU 110-12, the IAB node 120-11 may determine to accept a DRB by releasing another DRB. In some embodiments, the second admission response may include an identity of the different terminal device and an identity of the DRB to be released. Accordingly, the Donor-CU 110-11 receives (340) the second admission response from the IAB node 120-11.

The Donor-CU 110-11 transmits (350) a third admission request to the IAB node 120-21 serving the terminal device 140. The third admission request comprises information about one or more resources in the resource set. In some embodiments, the one or more resources may include all or part of the resources in the resource set.

It should be understood that the act 350, the act 330 and the act 310 may be performed in parallel, or the act 330 and act 310 may be performed in parallel and act 350 is performed after the acts 310 and 330, or the act 350 may be performed after the acts 310, 320, 330 and 340. The scope of the present disclosure is not limited thereto.

In embodiments where the act 350, or the act 330 and the act 310 are performed in parallel, the information about one or more resources in the third admission request may include information about all of the resources in the resource set because the Donor-CU 110-11 has no knowledge about the admission control results of the Donor-DU 110-12 and the IAB node 120-11.

In embodiments where the act 350 may be performed after the acts 310, 320, 330 and 340, the information about one or more resources in the third admission request may include information about part of the resources in the resource set so as to simplify the process of the IAB node 120-21. In such embodiments, upon receiving (320) the first admission response from the Donor-DU 110-12 and receiving (340) the second admission response from the IAB node 120-11, the Donor-CU 110-11 may include the information about the first admission response and the second admission response in the third admission request. Then, the Donor-CU 110-11 transmits to the IAB node 120-21 the third admission request including the information about the first and second admission responses.

Consider an example where the DRB set includes a third DRB, a fourth DRB and a fifth DRB. Upon receiving the first admission request from the Donor-CU 110-11, the Donor-DU 110-12 may determine to accept the third DRB and the fifth DRB and to reject the fourth DRB if the Donor-DU 110-12 has not sufficient resources for all of the third, fourth and fifth DRBs. In this case, the Donor-DU 110-12 may transmit the first admission response indicating that the third DRB and the fifth DRB are to be accepted by the Donor-DU 110-12 and the fourth DRB is to be rejected by the Donor-DU 110-12.

Upon receiving the second admission request from the Donor-CU 110-11, the IAB node 120-11 may determine to accept the third DRB, to accept the fifth DRB if a sixth DRB for another terminal device is released, and to reject the fourth DRB if the Donor-DU 110-12 has not sufficient resources for all of the third, fourth and fifth DRBs. In this case, the Donor-DU 110-12 may transmit the second admission response indicating that the third DRB is to be accepted, the fifth DRB is to be accepted if the sixth DRB for another terminal device is released, and the fourth DRB is to be rejected by the Donor-DU 110-12.

The Donor-CU 110-11 may include the information about the first and second admission responses in the third admission request, indicating to the IAB node 120-21 that the third DRB is to be accepted, the fifth DRB is to be accepted if the sixth DRB for another terminal device is released, and the fourth DRB is to be rejected.

Upon receiving the third admission request from the Donor-CU 110-11, the IAB node 120-21 may do not take the fourth DRB into account, but determine whether it has sufficient resources for the third and fifth DRBs. In this manner, the processing of the IAB node 120-21 may be simplified.

Alternatively, the Donor-CU 110-11 may include only the information about the third DRB and the fifth DRB in the third admission request. Thus, the IAB node 120-11 may only determine whether it has sufficient resources for the third DRB and the fifth DRB. In this manner, the processing of the IAB node 120-21 may be also simplified.

Upon receiving the third admission request from the Donor-CU 110-11, the IAB node 120-21 determines whether one or more resources in the resource set are to be accepted based on the information in the third admission request.

Similar to the operations of the Donor-DU 110-12, with respect to a DRB in the second subset, the IAB node 120-21 may accept the DRB if the IAB node 120-21 has sufficient resources for the DRB. If the IAB node 120-21 has not sufficient resources for the DRB, the IAB node 120-21 may accept the DRB by releasing resources for a further DRB with a lower priority than the DRB based on the criteria as specified in TS 38.413, for example.

Upon determining whether the one or more resources in the resource set are to be accepted, the IAB node 120-21 transmits a third admission response to the Donor-CU 110-11. The third admission response indicates whether the one or more resources in the resource set are to be accepted by the IAB node 120-21. Accordingly, the Donor-CU 110-11 receives (360) the third admission response from the IAB node 120-21.

It should be noted that even if the Donor-DU 110-12 and the IAB node 120-11 determine that a DRB is to be released, the Donor-DU 110-12 and the IAB node 120-11 will not release the DRB. Instead, the Donor-DU 110-12 and the IAB node 120-11 just provide the Donor-CU 110-11 with suggestion that the DRB should be released. For example, if the Donor-CU 110-11 makes a different decision on DRBs to be released, or if the serving IAB node 120-21 for the terminal device 140 rejects the DRB to be established, there is no need for the Donor-DU 110-12 and the IAB node 120-11 to change the current active second DRB.

Based on the first, the second and the third admission responses, the Donor-CU 110-11 has full knowledge of the resource usage in the Donor-DU 110-12, the IAB node 120-11 and the IAB node 120-21. Thus, the Donor-CU 110-11 may make (370) an initial decision on whether to accept all or part of the resources in the resource set, accept one or more resources in the resource set with the preemption of another resource, or even reject all the resources. If the Donor-CU 110-11 determines that at least one resource in the resource set is to be accepted by all of the Donor-DU 110-12, the IAB node 120-11 and the JAB node 120-21, the Donor-CU 110-11 transmits (380) to the IAB node 120-21 a request for establishing a context of the terminal device 140. The request comprises information about the at least one resource. In some embodiments, the Donor-CU can make the decision after acts 310, 320, 330 and 340 are performed, then the act 380 can be combined with the act 350.

In embodiments where the second DRB to be released has been established for a further terminal device served by the IAB node 120-21, the request for establishing the context of the terminal device 140 may include information about the second DRB to be released. For example, the request may include an identity of the further terminal device and an identity of the second DRB.

In some embodiments, upon receiving the request, the IAB node 120-21 may release the second DRB.

In some embodiments, the second DRB to be released may belong to a terminal device that has a very good radio connection. The terminal device 140 may have poor radio conditions with a low MCS. Thus, more radio resources are required to support the required QoS of the first DRB to be established. That is, resources occupied by the second DRB are less than resources required by the first DRB to be established. In such embodiments, the IAB node 120-21 may release the second DRB and release another DRB for another terminal device. Alternatively, the IAB node 120-21 may release a further DRB for a further terminal device, wherein resources occupied by the further DRB is equal to or greater than the resource required by the first DRB.

In some embodiments where the IAB node 120-21 has sufficient radio resources, the IAB node 120-21 may still release the second DRB in order to free backhaul resources for the DRB to be established. It should be noted that this is different from the conventional admission control in a DU. In the conventional admission control, the DU only checks the radio resources. If there are sufficient radio resources, the DU does not perform pre-emption or release existing one or more DRBs.

In some embodiments, the IAB node 120-21 may configures the terminal device 140 for the accepted one or more DRBs. Upon configuration, the IAB node 120-21 may transmit to the Donor-CU 110-11 a response to the request for establishing the context of the terminal device 140.

Upon receiving the response to the request for establishing the context of the terminal device 140, the Donor-CU 110-11 may update the Donor-DU 110-12, the IAB node 120-11 and the IAB node 120-21 with the final list of DRBs to be released. In embodiments where the second DRB to be released has been established for a terminal device served by other IAB node than the IAB node 120-21, the Donor-CU 110-11 may release the second DRB.

In some embodiments, each of the first, second and third admission responses may also indicate the available bandwidth of the backhaul. With the information about the available bandwidth, the Donor-CU 110-11 may perform admission control for further new DRBs, without checking with the Donor-DU 110-12 and IAB nodes.

In some embodiments, the Donor-DU 110-12 or each of the IAB nodes may also periodically report the available bandwidth of the backhaul, or report the available bandwidth of the backhaul when there is a big divergence from previous report (e.g. 10%).

In some embodiments, each of the first, second and third admission responses may include advice on multi-connectivity indicating the routing advice to the Donor-CU 110-11. For example, one parent IAB node may have lower MCS and lower variance because of low-delay angular spread channel while the other parent IAB node may have higher MCS and a larger variance to higher angular spread channel. Similarly, the IAB node may provide routing advice to the Donor-CU 110-11 on the child node based on similar channel knowledge.

It is to be understood that in some embodiments, the act 310 may be performed after the act 330. In such embodiments, upon receiving the second admission response from the IAB node 120-11, the Donor-CU 110-11 includes information about the second admission response in the first admission request, and transmits the first admission request to the Donor-DU 110-12.

It is to be understood that the admission control solution of the present disclosure may be used for establishing one or more DRBs for the terminal device 150 served by the JAB node 120-31. In such embodiments, the process of admission control may involve the Donor-CU 110-11, the Donor-DU 110-12, the IAB node 120-11, the IAB node 120-21 and the IAB node 120-31. The Donor-CU 110-11 may transmit admission requests to the Donor-DU 110-12, the IAB node 120-11, the LAB node 120-21 and the IAB node 120-31 respectively, and receive admission responses from the Donor-DU 110-12, the IAB node 120-11, the IAB node 120-21 and the IAB node 120-31 respectively. If the Donor-CU 110-11 determines that at least one DRB is to be accepted by all of the Donor-DU 110-12 and the IAB nodes 120-11, 120-21 and 120-31, the Donor-CU 110-11 transmits to the JAB node 120-31 a request for establishing a context of the terminal device 150.

In some embodiments, the admission control solution may be used when a terminal device is handover to an IAB node. The above process may be performed during the handover preparation procedure.

Figure 4:
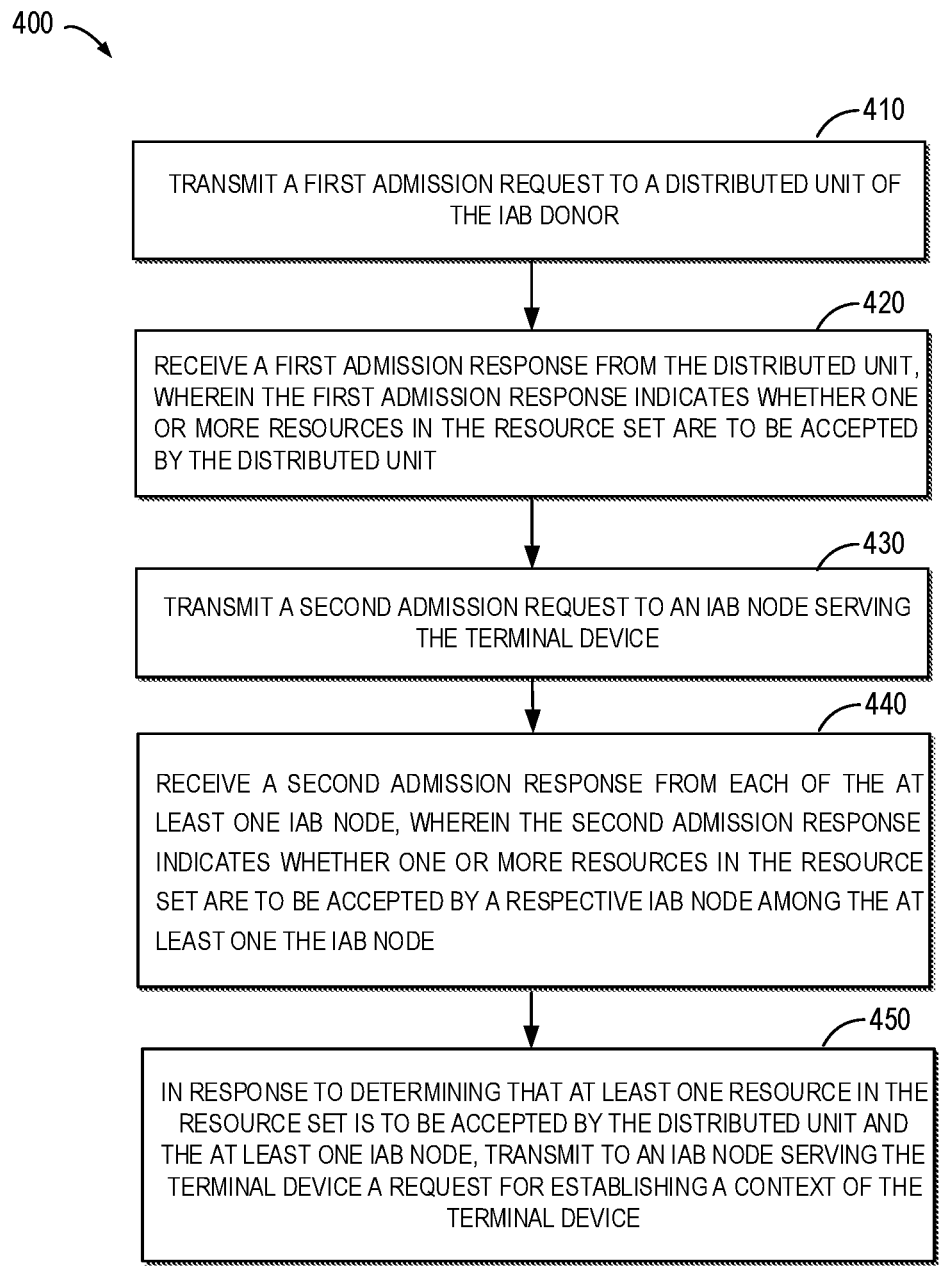
FIG. 4 is a flowchart of a method of admission control in accordance with some example embodiments of the present disclosure.

FIG. 4 is a flowchart of a method 400 of admission control in accordance with some embodiments of the present disclosure. For example, the method 400 can be implemented at the Donor-CU 110-11 as shown in FIG. 1. It is to be understood that the method 400 may include additional blocks not shown and/or may omit some blocks as shown, and the scope of the present disclosure is not limited in this regard.

At block 410, the Donor-CU 110-11 transmits a first admission request to the Donor-DU 110-21, wherein the first admission request comprises information about a resource set to be established for a terminal device.

At block 420, the Donor-CU 110-11 receives a first admission response from the Donor-DU 110-12, wherein the first admission response indicates whether one or more resources in the resource set are to be accepted by the Donor-DU 110-12.

At block 430, the Donor-CU 110-11 transmits a second admission request to at least one IAB node, wherein the second admission request comprises information about the resource set.

At block 440, the Donor-CU 110-11 receives a second admission response from the at least one IAB node, wherein the second admission response indicates whether the one or more resources in the resource se are to be accepted by the at least one IAB node.

At block 450, the Donor-CU 110-11 transmits to an IAB node serving the terminal device a request for establishing a context of the terminal device in response to determining that at least one resource in the resource set is to be accepted by all of the Donor-DU 110-12 and the IAB nodes, wherein the request comprises information about the at least one resource.

In some example embodiments, transmitting the second admission request to each of the at least one IAB node comprises: upon receiving the first admission response from the distributed unit of the IAB donor, including information about the first admission response in the second admission request; and transmitting the second admission request to each of the at least one IAB node.

In some example embodiments, the resource set comprises a first dedicated radio bearer; the first admission response indicates that the first dedicated radio bearer is to be accepted by the distributed unit of the IAB donor if a second dedicated radio bearer is released; and the second admission response indicates that the first dedicated radio bearer is to be accepted by the IAB node.

In some example embodiments, the second dedicated radio bearer has been established for a further terminal device served by the IAB node; and the request further comprises information about the second dedicated radio bearer.

In some example embodiments, the second dedicated radio bearer has been established for another terminal device served by the distributed unit of the IAB donor or by one of the at least one the IAB node; and the method further comprises: releasing the second dedicated radio bearer by the centralized unit.

In some example embodiments, the first admission response comprise an identity of the further terminal device and an identity of the second dedicated radio bearer.

In some example embodiments, the dedicated radio bearer set comprises a third dedicated radio bearer and a fourth dedicated radio bearer that is different from the third dedicated radio bearer; the first admission response indicates that the third dedicated radio bearer is to be accepted by the distributed unit of the IAB donor and the fourth dedicated radio bearer is to be rejected by the distributed unit of the IAB donor; and the information about the first admission response comprises information about the third dedicated radio bearer.

Figure 5:
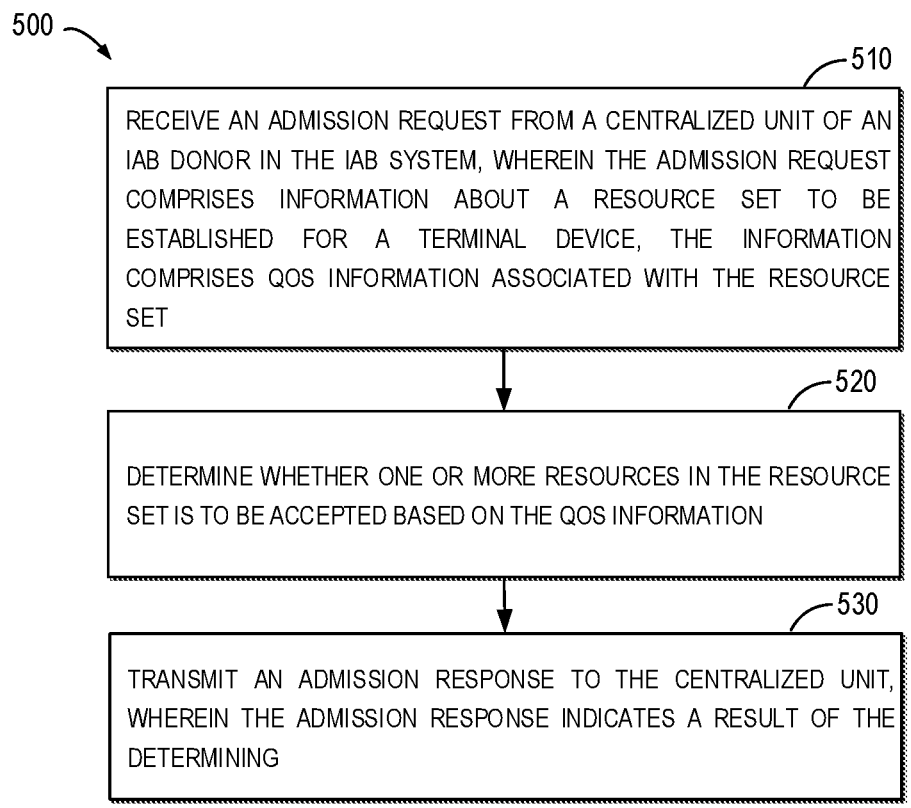
FIG. 5 is a flowchart of a method of admission control in accordance with some example embodiments of the present disclosure.

FIG. 5 is a flowchart of a method 500 of admission control in accordance with some embodiments of the present disclosure. For example, the method 500 can be implemented at the Donor-DU 110-12, or the IAB nodes 120 that are in the path between the Donor DU 110-12 and the terminal devices 130 and 140 as shown in FIG. 1. It is to be understood that the method 500 may include additional blocks not shown and/or may omit some blocks as shown, and the scope of the present disclosure is not limited in this regard. For the purpose of discussion, the method 500 will be described with reference to FIG. 1 and by taking example of implementation at the IAB node 120-11 and the terminal device 130.

At block 510, the IAB node 120-11 receives an admission request from a centralized unit of an IAB donor in the IAB system, wherein the admission request comprises information about a resource set to be established for a terminal device, the information comprises QoS information associated with the resource set.

At block 520, the IAB node 120-11 determines whether one or more resources in the resource set is to be accepted based on the QoS information.

At block 530, the IAB node 120-11 transmits an admission response to the centralized unit, wherein the admission response indicates a result of the determining.

In some example embodiments, the resource set comprise a first dedicated radio bearer; and the result of the determining comprises: the first dedicated radio bearer is to be accepted if a second dedicated radio bearer is released.

In some example embodiments, the distributed unit is implemented in an IAB node in the IAB system.

In some example embodiments, the method further comprises: receiving, from the centralized unit, a request for establishing a context of the terminal device, wherein the request comprises information about the first dedicated radio bearer to be established and information about the second dedicated radio bearer to be released.

In some example embodiments, the method further comprises: releasing the second dedicated radio bearer.

In some example embodiments, the method further comprises: in response to determining that resources occupied by the second dedicated radio bearer are less than resources required by the first dedicated radio bearer, releasing the second dedicated radio bearer and a third dedicated radio bearer.

In some example embodiments, the method further comprises: in response to determining that resources occupied by the second dedicated radio bearer are less than resources required by the first dedicated radio bearer, releasing a fourth dedicated radio bearer, wherein resources occupied by the fourth dedicated radio bearer are equal to or greater than the resource required by the first dedicated radio bearer.

In some example embodiments, the distributed unit is implemented in the IAB donor.

In some example embodiments, the apparatus comprise means for transmitting a first admission request to a distributed unit of the IAB donor, wherein the first admission request comprises information about a resource set to be established for a terminal device; means for receiving a first admission response from the distributed unit, wherein the first admission response indicates whether one or more resources in the resource set are to be accepted by the distributed unit; means for transmitting a second admission request to at least one IAB node, wherein the second admission request comprises information about the resource set; means for receiving a second admission response from the at least one IAB node, wherein the second admission response indicates whether one or more resources in the resource set are to be accepted by the IAB node; and means for transmitting to an JAB node serving the terminal device a request for establishing a context of the terminal device in response to determining that at least one resource in the resource set is to be accepted by the distributed unit and the at least one IAB node, wherein the request comprises information about the at least one resource.

In some example embodiments, means for transmitting the second admission request to the at least one IAB node comprises: upon receiving the first admission response from the distributed unit of the IAB donor, means for including information about the first admission response in the second admission request; and means for transmitting the second admission request to the IAB node.

In some example embodiments, the resource set comprises a first dedicated radio bearer; the first admission response indicates that the first dedicated radio bearer is to be accepted by the distributed unit of the IAB donor if a second dedicated radio bearer is released; and the second admission response indicates that the first dedicated radio bearer is to be accepted by the IAB node.

In some example embodiments, the second dedicated radio bearer has been established for a further terminal device served by the IAB node; and the request further comprises information about the second dedicated radio bearer.

In some example embodiments, the second dedicated radio bearer has been established for another terminal device served by the distributed unit of the IAB donor or by one of the at least one the IAB node; and the method further comprises: releasing the second dedicated radio bearer by the centralized unit.

In some example embodiments, the first admission response comprise an identity of the further terminal device and an identity of the second dedicated radio bearer.

In some example embodiments, the dedicated radio bearer set comprises a third dedicated radio bearer and a fourth dedicated radio bearer that is different from the third dedicated radio bearer; the first admission response indicates that the third dedicated radio bearer is to be accepted by the distributed unit of the IAB donor and the fourth dedicated radio bearer is to be rejected by the distributed unit of the IAB donor; and the information about the first admission response comprises information about the third dedicated radio bearer.

In some example embodiments, an apparatus capable of performing the method 500 (for example, a network device implementing the Donor-DU 110-12 or the IAB node 120-11) may comprise means for performing the respective steps of the method 500. The means may be implemented in any suitable form. For example, the means may be implemented in a circuitry or software module.

In some example embodiments, the apparatus comprises: means for receiving an admission request from a centralized unit of an IAB donor in the IAB system, wherein the admission request comprises information about a resource set to be established for a terminal device, the information comprises Quality of Service, QoS, information associated with the resource set; means for determining whether one or more resources in the resource set is to be accepted based on the QoS information; and means for transmitting an admission response to the centralized unit, wherein the admission response indicates a result of the determining.

In some example embodiments, the resource set comprise a first dedicated radio bearer; and the result of the determining comprises: the first dedicated radio bearer is to be accepted if a second dedicated radio bearer is released.

In some example embodiments, the distributed unit is implemented in an IAB node in the IAB system.

In some example embodiments, the method further comprises: receiving, from the centralized unit, a request for establishing a context of the terminal device, wherein the request comprises information about the first dedicated radio bearer to be established and information about the second dedicated radio bearer to be released.

In some example embodiments, the method further comprises: releasing the second dedicated radio bearer.

In some example embodiments, the method further comprises: in response to determining that resources occupied by the second dedicated radio bearer are less than resources required by the first dedicated radio bearer, releasing the second dedicated radio bearer and a third dedicated radio bearer.

In some example embodiments, the method further comprises: in response to determining that resources occupied by the second dedicated radio bearer are less than resources required by the first dedicated radio bearer, releasing a fourth dedicated radio bearer, wherein resources occupied by the fourth dedicated radio bearer are equal to or greater than the resource required by the first dedicated radio bearer.

In some example embodiments, the distributed unit is implemented in the IAB donor.

Figure 6:
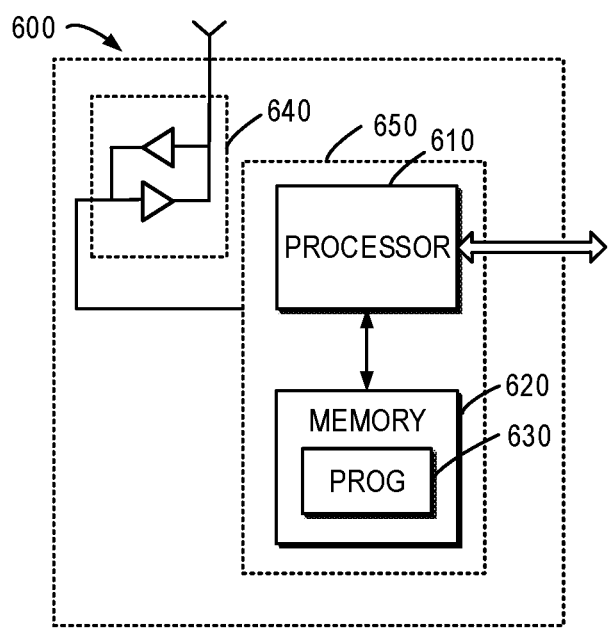
FIG. 6 is a block diagram of a device that is suitable for implementing example embodiments of the present disclosure.

FIG. 6 is a simplified block diagram of a device 600 that is suitable for implementing embodiments of the present disclosure. The device 600 can be considered as a further example implementation of the Donor-CU 110-11, the Donor-DU 110-12 or the IAB node 120-11 as shown in FIG. 1. Accordingly, the device 600 can be implemented at or as at least a part of the Donor-CU 110-11, the Donor-DU 110-12 or the IAB node 120-11.

As shown, the device 600 includes a processor 610, a memory 620 coupled to the processor 610, a suitable transmitter (TX) and receiver (RX) 640 coupled to the processor 610, and a communication interface coupled to the TX/RX 640. The memory 620 stores at least a part of a program 630. The TX/RX 640 is for bidirectional communications. The TX/RX 640 has at least one antenna to facilitate communication, though in practice an Access Node mentioned in this application may have several ones. The communication interface may represent any interface that is necessary for communication with other network elements, such as Xn interface for bidirectional communications between gNBs, N1 interface for communication between an Access Management Function (AMF)/Session Management Function (SMF) and the gNB, F1 interface for communication between the IAB Node DU and an IAB Node CU or Uu interface for communication between the gNB and UE.

The program 630 is assumed to include program instructions that, when executed by the associated processor 610, enable the device 600 to operate in accordance with the embodiments of the present disclosure, as discussed herein with reference to FIGS. 1 to 10.

The embodiments herein may be implemented by computer software executable by the processor 610 of the device 600, or by hardware, or by a combination of software and hardware. The processor 610 may be configured to implement various embodiments of the present disclosure. Furthermore, a combination of the processor 610 and memory 620 may form processing means 650 adapted to implement various embodiments of the present disclosure.

The memory 620 may be of any type suitable to the local technical network and may be implemented using any suitable data storage technology, such as a non-transitory computer readable storage medium, semiconductor based memory devices, magnetic memory devices and systems, optical memory devices and systems, fixed memory and removable memory, as non-limiting examples. While only one memory 620 is shown in the device 600, there may be several physically distinct memory modules in the device 600. The processor 610 may be of any type suitable to the local technical network, and may include one or more of general purpose computers, special purpose computers, microprocessors, digital signal processors (DSPs) and processors based on multicore processor architecture, as non-limiting examples. The device 600 may have multiple processors, such as an application specific integrated circuit chip that is slaved in time to a clock which synchronizes the main processor.

Generally, various example embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the methods 400, 500 as described above with reference to FIGS. 4 and 5. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, apparatus or processor to perform various processes and operations as described above. Examples of the carrier include a signal, computer readable media.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A communication method implemented at a centralized unit of an integrated access and backhaul donor in an integrated access and backhaul system, comprising:
    transmitting a first admission request to a distributed unit of the integrated access and backhaul donor, wherein the first admission request comprises information about a resource set to be established for a terminal device;
    receiving a first admission response from the distributed unit, wherein the first admission response indicates whether one or more first resources in the resource set are to be accepted by the distributed unit;
    transmitting a second admission request to at least one integrated access and backhaul node, wherein the second admission request comprises information about the first admission response;
    receiving a second admission response from the at least one integrated access and backhaul node,
    wherein the second admission response indicates whether one or more second resources in the resource set are to be accepted by a respective integrated access and backhaul node among the at least one integrated access and backhaul node; and
    in response to determining that at least one resource in the resource set is to be accepted by the distributed unit and the at least one integrated access and backhaul node, transmitting to an integrated access and backhaul node serving the terminal device a request for establishing a context of the terminal device, wherein the request comprises information about the at least one resource.

2. The method of claim 1, wherein:
    the resource set comprises a first dedicated radio bearer;
    the first admission response indicates that the first dedicated radio bearer is to be accepted by the distributed unit of the integrated access and backhaul donor in response to a second dedicated radio bearer being released; and
    the second admission response indicates that the first dedicated radio bearer is to be accepted by the respective integrated access and backhaul node.

3. The method of claim 2, wherein:
    the second dedicated radio bearer has been established for a further terminal device served by the integrated access and backhaul node; and
    the request for establishing the context of the terminal device further comprises information about the second dedicated radio bearer.

4. The method of claim 2, wherein the second dedicated radio bearer has been established for another terminal device served by the distributed unit of the integrated access and backhaul donor or by one of the at least one integrated access and backhaul node; and the method further comprises:
    releasing the second dedicated radio bearer by the centralized unit.

5. The method of claim 3, wherein the first admission response comprise an identity of the further terminal device and an identity of the second dedicated radio bearer.

6. The method of claim 1, wherein:
    a dedicated radio bearer set comprises a third dedicated radio bearer and a fourth dedicated radio bearer that is different from the third dedicated radio bearer;
    the first admission response indicates that the third dedicated radio bearer is to be accepted by the distributed unit of the integrated access and backhaul donor and the fourth dedicated radio bearer is to be rejected by the distributed unit of the integrated access and backhaul donor; and
    the information about the first admission response comprises information about the third dedicated radio bearer.

7. A communication method implemented at a distributed unit in an integrated access and backhaul system, comprising:
    receiving an admission request from a centralized unit of an integrated access and backhaul donor in the integrated access and backhaul system, wherein the admission request comprises information about a resource set to be established for a terminal device, the information comprises quality of service information associated with the resource set, wherein the resource set comprises a first dedicated radio bearer;

determining whether one or more resources in the resource set is to be accepted based on the quality of service information; and transmitting an admission response to the centralized unit, wherein the admission response indicates a result of the determining, wherein the result of the determining comprises the first dedicated radio bearer is to be accepted in response to a second dedicated radio bearer being released.

8. The method of claim 7, wherein the distributed unit is implemented in an integrated access and backhaul node in the integrated access and backhaul system.

9. The method of claim 8, further comprises:
receiving, from the centralized unit, a request for establishing a context of the terminal device, wherein the request comprises information about the first dedicated radio bearer to be established and information about the second dedicated radio bearer to be released.

10. The method of claim 9, further comprises:
releasing the second dedicated radio bearer.

11. The method of claim 9, further comprises:
in response to determining that resources occupied by the second dedicated radio bearer are less than resources required by the first dedicated radio bearer, releasing the second dedicated radio bearer and a third dedicated radio bearer.

12. The method of claim 9, further comprises:
in response to determining that resources occupied by the second dedicated radio bearer are less than resources required by the first dedicated radio bearer, releasing a fourth dedicated radio bearer, wherein resources occupied by the fourth dedicated radio bearer are equal to or greater than the resources required by the first dedicated radio bearer.

13. The method of claim 7, wherein the distributed unit is implemented in the integrated access and backhaul donor.

14. A network device, comprising:
at least one processor; and
at least one non-transitory memory including computer program code;
the at least one memory and the computer program code configured to, with the at least one processor, cause the device to perform the method of claim 1.

15. A network device, comprising:
at least one processor; and
at least one non-transitory memory including computer program code;
the at least one memory and the computer program code configured to, with the at least one processor, cause the device to perform the method of claim 7.

16. A communication apparatus, comprising:
circuitry configured to transmit a first admission request to a distributed unit of an integrated access and backhaul donor, wherein the first admission request comprises information about a resource set to be established for a terminal device;
circuitry configured to receive a first admission response from the distributed unit, wherein the first admission response indicates whether one or more first resources in the resource set are to be accepted by the distributed unit;
circuitry configured to transmit a second admission request to at least one integrated access and backhaul node, wherein the second admission request comprises information about the first admission response;
circuitry configured to receive a second admission response from the at least one integrated access and backhaul node, wherein the second admission response indicates whether one or more second resources in the resource set are to be accepted by a respective integrated access and backhaul node among the at least one integrated access and backhaul node; and
circuitry configured to transmit to an integrated access and backhaul node serving the terminal device a request for establishing a context of the terminal device in response to determining that at least one resource in the resource set is to be accepted by the distributed unit and the at least one integrated access and backhaul node, wherein the request comprises information about the at least one resource.

17. A communication apparatus, comprising:
circuitry configured to receive an admission request from a centralized unit of an integrated access and backhaul donor in an integrated access and backhaul system, wherein the admission request comprises information about a resource set to be established for a terminal device, the information comprises quality of service information associated with the resource set, wherein the resource set comprises a first dedicated radio bearer;
circuitry configured to determine whether one or more resources in the resource set is to be accepted based on the quality of service information; and
circuitry configured to transmit an admission response to the centralized unit, wherein the admission response indicates a result of the determining, wherein the result of the determining comprises the first dedicated radio bearer is to be accepted in response to a second dedicated radio bearer being released.

18. A non-transitory computer-readable medium storing a computer program thereon, the computer program, when executed by a processor, causing the processor to carry out the method of claim 1.

19. A non-transitory computer-readable medium storing a computer program thereon, the computer program, when executed by a processor, causing the processor to carry out the method of claim 7.

* * * * *